(12) United States Patent
Zhou et al.

(10) Patent No.: US 9,384,552 B2
(45) Date of Patent: Jul. 5, 2016

(54) IMAGE REGISTRATION METHODS FOR STILL IMAGE STABILIZATION

(71) Applicant: Apple Inc., Cupertino, CA (US)

(72) Inventors: Jianping Zhou, Fremont, CA (US);
Paul Hubel, Mountain View, CA (US);
Marius Tico, Mountain View, CA (US);
Anita Nariani Schulze, Los Altos, CA (US); Rolf Toft, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 13/911,793

(22) Filed: Jun. 6, 2013

(65) Prior Publication Data

US 2014/0363096 A1    Dec. 11, 2014

(51) Int. Cl.
*G06T 7/00* (2006.01)

(52) U.S. Cl.
CPC ..... *G06T 7/0028* (2013.01); *G06T 2207/10016* (2013.01); *G06T 2207/20016* (2013.01)

(58) Field of Classification Search
CPC .................. G06T 7/0028; G06T 2207/20016; G06T 2207/10016; G06T 2207/20201
See application file for complete search history.

(56) References Cited

U.S. PATENT DOCUMENTS

| | | | |
|---|---|---|---|
| 5,646,521 A | 7/1997 | Rosenthal | |
| 5,920,657 A | 7/1999 | Bender | |
| 6,271,847 B1 | 8/2001 | Shum | |
| 6,301,440 B1 | 10/2001 | Bolle | |
| 6,552,744 B2 | 4/2003 | Chen | |
| 7,130,864 B2 | 10/2006 | Lin | |
| 7,424,218 B2 | 9/2008 | Baudisch | |
| 7,602,418 B2 | 10/2009 | Border | |
| 7,639,741 B1 * | 12/2009 | Holt | G06T 5/50 375/240.08 |
| 7,688,379 B2 | 3/2010 | Forman | |
| 7,742,083 B2 | 6/2010 | Fredlund | |
| 7,839,429 B2 | 11/2010 | Williams | |
| 7,856,120 B2 | 12/2010 | Porikli | |
| 7,929,853 B2 | 4/2011 | Park | |
| 7,991,196 B2 | 8/2011 | Tener | |

(Continued)

FOREIGN PATENT DOCUMENTS

WO    0013407    3/2000

OTHER PUBLICATIONS

Madiha Hussain Malik, et al.: "Wavelet Based Exposure Fusion," Lecture Notes in Engineering and Computer Science, Jul. 2, 2008, pp. 688-693, XP055132823, Retrieved from the Internet: URL: http://www.iaeng.org/publication/WCE2008/WCE2008_pp688-693.pdf [retrieved on Jul. 31, 2014].

(Continued)

*Primary Examiner* — Stephen R Koziol
*Assistant Examiner* — Pinalben Patel
(74) *Attorney, Agent, or Firm* — Blank Rome LLP (57) ABSTRACT

Systems, methods, and computer readable media to improve image stabilization operations are described. A novel approach to pixel-based registration of non-reference images to a reference frame in a set of commonly captured images is disclosed which makes use of pyramid decomposition to more efficiently detect corners. The disclosed pixel-based registration operation may also be combined with motion sensor data-based registration approaches to register non-reference images with respect to the reference frame. When the registered non-reference images are combined with the pre-selected reference image, the resulting image is a quality stabilized image.

15 Claims, 11 Drawing Sheets

(56) References Cited

U.S. PATENT DOCUMENTS

| | | |
|---|---|---|
| 8,018,999 B2 | 9/2011 | Yao |
| 8,023,000 B2 | 9/2011 | Tamaru |
| 8,189,051 B2 | 5/2012 | Shih |
| 8,335,400 B2 | 12/2012 | Kobayashi |
| 8,699,822 B2 | 4/2014 | Park |
| 2003/0184778 A1* | 10/2003 | Chiba ............... G06T 7/0028 358/1.9 |
| 2005/0228849 A1 | 10/2005 | Zhang |
| 2006/0210166 A1 | 9/2006 | Takemoto |
| 2006/0257048 A1 | 11/2006 | Lin |
| 2007/0182861 A1 | 8/2007 | Luo |
| 2007/0222864 A1* | 9/2007 | Hiraga ............... G06T 7/2073 348/208.4 |
| 2008/0037869 A1 | 2/2008 | Zhou |
| 2008/0166115 A1* | 7/2008 | Sachs et al. ................ 396/55 |
| 2008/0170126 A1 | 7/2008 | Tico |
| 2008/0192129 A1 | 8/2008 | Walker |
| 2009/0115859 A1* | 5/2009 | Lee ...................... 348/208.4 |
| 2009/0161982 A1 | 6/2009 | Tico |
| 2009/0169102 A1 | 7/2009 | Zhang |
| 2009/0263028 A1 | 10/2009 | Kwon |
| 2010/0017115 A1 | 1/2010 | Gautama |
| 2010/0020224 A1 | 1/2010 | Hattori |
| 2010/0053346 A1* | 3/2010 | Mitsunaga ............... 348/208.6 |
| 2010/0165122 A1 | 7/2010 | Castorina |
| 2010/0183225 A1 | 7/2010 | Vantaram |
| 2010/0231593 A1* | 9/2010 | Zhou et al. ............... 345/428 |
| 2010/0271512 A1 | 10/2010 | Garten |
| 2010/0277609 A1 | 11/2010 | Abe |
| 2011/0038548 A1 | 2/2011 | Rezazadeh |
| 2011/0311147 A1 | 12/2011 | Pahalawatta |
| 2012/0069203 A1* | 3/2012 | Voss et al. ............... 348/208.1 |
| 2012/0076427 A1 | 3/2012 | Hibino |
| 2012/0082389 A1 | 4/2012 | Sakamoto |
| 2012/0086829 A1 | 4/2012 | Hohjoh |
| 2012/0120283 A1 | 5/2012 | Capata |
| 2012/0121202 A1 | 5/2012 | Wang |
| 2012/0154579 A1* | 6/2012 | Hampapur ............ G06T 7/2006 348/143 |
| 2012/0183202 A1 | 7/2012 | Wei |
| 2012/0201427 A1 | 8/2012 | Jasinski |
| 2012/0218427 A1 | 8/2012 | Wu |
| 2012/0249826 A1 | 10/2012 | Kobayashi |
| 2012/0281924 A1 | 11/2012 | Coulombe |
| 2012/0281969 A1 | 11/2012 | Jiang |
| 2012/0293607 A1 | 11/2012 | Bhogal |
| 2012/0300023 A1 | 11/2012 | Lee |
| 2012/0306999 A1* | 12/2012 | Zhou ................... H04N 5/2624 348/36 |
| 2013/0028509 A1 | 1/2013 | Moon |
| 2013/0044230 A1* | 2/2013 | Zhou ................... H04N 5/2329 348/208.6 |
| 2013/0148860 A1* | 6/2013 | Musatenko .......... G06K 9/6206 382/107 |
| 2013/0208997 A1* | 8/2013 | Liu ....................... G06T 3/20 382/284 |
| 2013/0265451 A1 | 10/2013 | Son |
| 2014/0071299 A1* | 3/2014 | Grundmann et al. ...... 348/207.1 |
| 2014/0363087 A1* | 12/2014 | Tico ....................... G06T 5/003 382/195 |

OTHER PUBLICATIONS

Tico, M. et al.: "Robust Method of Digital Image Stabilization," 3rd International Symposium on Communications, Control and Signal Processing, 2008. ISCCSP 2008, IEEE, Piscataway, NJ, USA, Mar. 12, 2008, pp. 316-321, XP031269886, ISBN: 978-1-244-1687-5.

Luo, Yiwen, and Xiaoou Tang, "Photo and video quality evaluation: Focusing on the subject." Computer Vision—ECCV 2008. Springer Berlin Heidelberg, 2008, 386-399.

Yousefi, Siamak, M. Rahman, and Nasser Kehtarnavaz, "A new auto-focus sharpness function for digital and smart-phone cameras." Consumer Electronics, IEEE Transactions on 57.3 (2011): 1003-1009.

International Search Report and Written Opinion for Internationa Application No. PCT/US2014/052965, dated Nov. 20, 2014.

* cited by examiner

IMAGE REGISTRATION METHODS FOR STILL IMAGE STABILIZATION

BACKGROUND

This disclosure relates generally to the field of digital photography. More particularly, but not by way of limitation, this disclosure relates to still image stabilization techniques. As used herein, image stabilization refers to a collection of techniques for reducing motion-induced blurring during image capture operations. Such motion may result from the movement of the camera, objects in the scene, or both.

Taking high quality photographs in low ambient light conditions, or photographing dynamic scenes (e.g., sport scenes) is challenging due to camera motion and/or the motion of objects within a scene during image capture. One way to reduce motion blur without amplifying an image's noise is to capture and fuse multiple short exposed images of the scene. Such operations are often called 'Still Image Stabilization.' While shortening image exposure times can reduce motion blur artifacts, it does so at the expense of a noisier and/or darker image.

A common approach to image stabilization consists of (1) selecting a reference image from a set of multiple short exposed images, (2) globally registering all non-reference images with respect to the reference image, and (3) synthesizing an output image by fusing all captured images to the reference image. In this way the output image represents the scene as it was at the time the reference image was captured, where non-reference images are used to reduce the noise in the reference image by averaging/merging multiple observations of each reference pixel across all images.

A common approach to globally registering non-reference images with respect to the reference image is to use pixel information for the registration. Such a method is generally referred to as pixel-based registration. A pixel-based registration method involves registering non-reference images by matching their corresponding features with the reference image. This procedure has the advantage of being able to match with high accuracy those areas of the image which are the most visually relevant (e.g. textures, edges, corners). This is because the procedure is specifically based on matching features such as corners. However, although offering precision for close objects, pixel-based registration has the disadvantage of being limited in the amount of relative motion it can detect between two images. Larger motions between two different images may not be detectable by this procedure. In addition, rolling shutter distortion is also difficult to detect using a pixel-based registration approach. Moreover, currently used pixel-based registration methods are inefficient and can be improved.

SUMMARY

In one embodiment the inventive concept provides a method to combine motion sensor data-based registration of non-reference images with pixel-based analysis to register non-reference images. The method includes obtaining a first image and a first one or more additional images and obtaining motion information corresponding to each of the first one or more additional images. The method then involves compensating for motion between the first image and each of the first one or more additional images based in part, on each image's corresponding motion information to generate intermediary images for each of the one or more additional images, where each of the intermediary images has a corresponding image in the first one or more additional images. The method may then register the intermediary images with respect to the first image based, in part, on a pixel-level analysis of the first image and the intermediary images to generate an output image.

In another embodiment, the inventive concept provides an alternative method for combining motion sensor data-based registration of non-reference images with pixel-based analysis to register non-reference images. A method in accordance with this approach includes obtaining a first image and a first one or more additional images and obtaining motion information corresponding to each of the first one or more additional images. Transform matrices for each of the first one or more additional images based on the motion information may then be determined. The method then registers the second one or more additional images with respect to the first image based, at least in part, on a pixel-level analysis of the first image, the first one or more additional images and the transform matrices for each of the first one or more additional images to generate an output image.

In still another embodiment, motion sensor data-based registration of non-reference images may be combined with pixel-based analysis in an alternative way to register non-reference images. This approach involves obtaining a first image having a plurality of pixels arranged in rows, obtaining one or more additional images, wherein each pixels in the first image has a corresponding pixel in each of the one or more additional images, and obtaining motion information corresponding to each of the one or more additional images. A transform matrix is then determined for each segment of each of the one or more additional images based on the motion information, wherein each segment corresponds to a plurality of rows of pixels. The method may also involve compensating for motion between the first image and each of the one or more additional images based in part, on each image's corresponding motion information to generate intermediary images for each of the one or more additional images, where each of the intermediary images has a corresponding image in the first one or more additional images. A second transform matrix may then be determined for each of the one or more additional images based on a pixel-level analysis of the first image and the intermediary one or more additional images. Each image's segment transform matrices and the corresponding second transform matrices are combined to generate a transformation matrix for each segment of each of the first. The operation may then apply the transformation matrices to corresponding segments of the one or more additional images to generated one or more transformed segments for each of the first one or more additional images and combine the transformed segments for each of the first one or more additional images to register the one or more additional images.

In one embodiment, pixel-based registration of non-reference images involves obtaining a first and a second image and applying a pyramid decomposition algorithm on each of the first and the second images to generate a plurality of levels for each image. The method then includes detecting corners at each level of the firsts image and for each corner detected at each level of the first image, and searching for a corresponding corner in a corresponding level of the second image. A transformation matrix is then generated based on locations of the corresponding corners found and the transformation matrix is applied to the second image to register the second image.

In one embodiment, each of the above described methods, and variation thereof, may be implemented as a series of computer executable instructions. Such instructions may use any one or more convenient programming languages. Such instructions may be collected into modules and/or programs and stored in any media that is readable and executable by a computer system or other programmable control device.

DETAILED DESCRIPTION

This disclosure pertains to systems, methods, and computer readable media to improve image stabilization operations. In one embodiment, a novel method of motion sensor data-based registration of non-reference images with respect to a pre-selected reference image in a set of commonly captured images may be utilized. The motion sensor based registration process can make use of multiple motion samples for each image and handle rolling shutter correction. In another embodiment, a novel method of pixel-based registration may be used. The pixel-based registration method can make use of pyramid decomposition techniques to efficiently detect corners in multiple levels of a non-reference image and to find corresponding corners in the reference frame.

This pixel-based registration method may be combined with motion sensor data-based registration approaches to make use of the advantages of both registration techniques. When the registered non-reference images are combined with the pre-selected reference image, the resulting image is a quality stabilized image.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of image stabilization systems having the benefit of this disclosure.

One method used to register non-reference images with respect to a reference image involves using motion sensor data for the registration. This method registers non-reference images based on motion data provided by a motion sensor on the camera, such as a gyroscope, and sometimes does not use any image information. The method is generally based on estimating motion between images from camera rotation data provided by the motion sensor.

Figure 1:
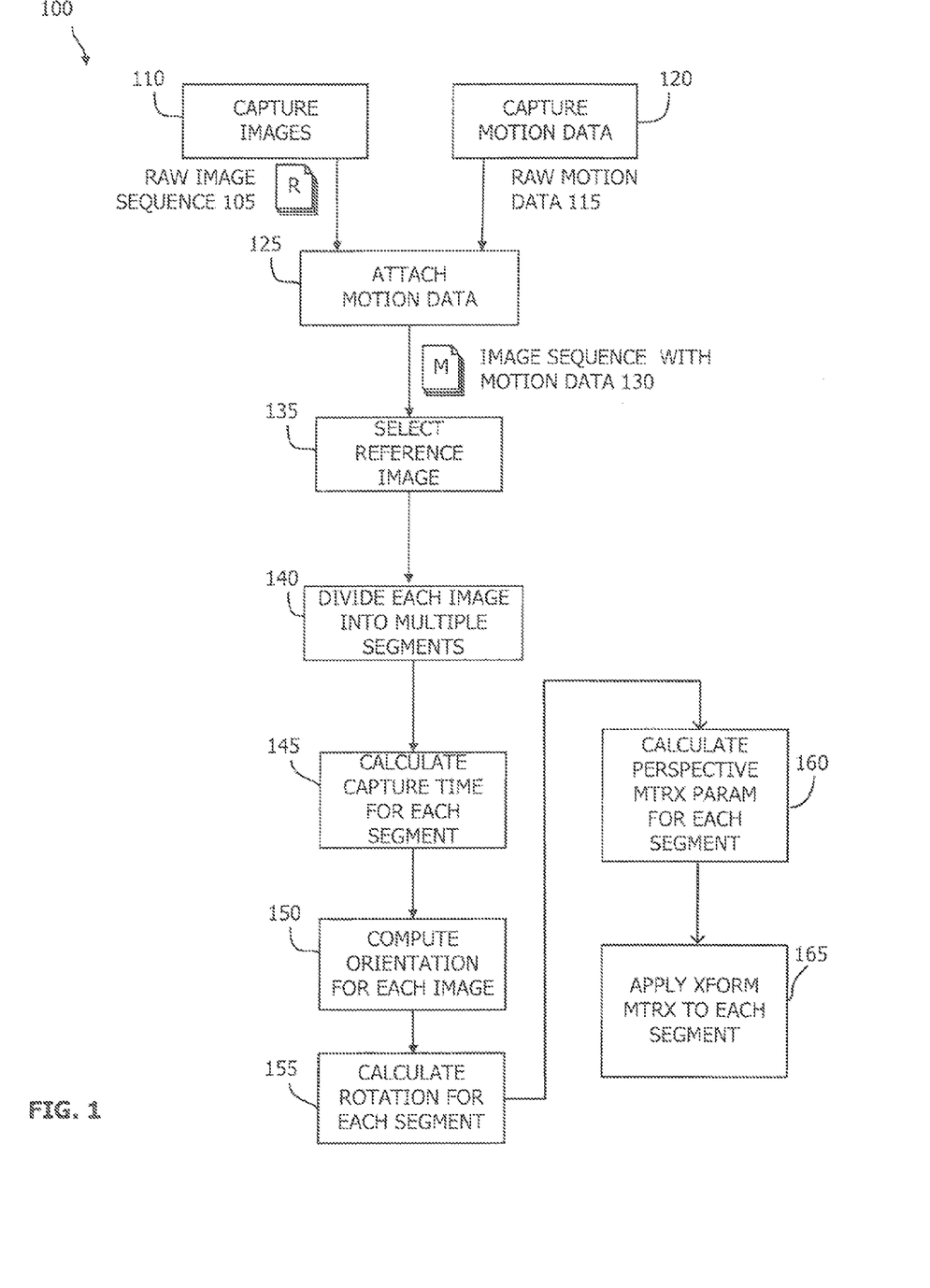
FIG. 1 shows, in flowchart form, a motion sensor data-based registration operation in accordance with one embodiment.

As illustrated in FIG. 1, motion sensor data based operation 100 in accordance with one embodiment begins by capturing raw image sequence 105 (block 110) and corresponding motion data 115 (block 120). Motion data 115 may then be attached to individual images within raw image sequence 105 (block 125) to produce image sequence 130. It can be advantageous to capture motion data for each image in raw image sequence 105 so that each captured image has a corresponding motion datum. It can also be advantageous, and is common, for each image in an image sequence to have a timestamp indicating when the particular image was captured (e.g., during acts in accordance with block 110). After motion data is attached to each image, one of the images in the image sequence 130 is selected as the reference image (block 135). There are a variety of methods for selecting the reference image. U.S. patent application concurrently filed with this application and entitled "Reference Frame Selection for Still Image Stabilization", incorporated herein by reference, describes one such method.

After a reference image has been selected, each non-reference image in the image sequence can be divided into multiple segments (block 140) and capture times for each segment calculated (block 145). Then, the orientation of the capturing device (e.g., camera) for each segment can be calculated by interpolating the motion data based on the capture time and motion sensor timestamps (block 150). A three dimensional rotation may then be calculated for each segment with respect to a corresponding segment of the reference image (block 155) and used to generate a perspective transform matrix for each segment (block 160). Generating a perspective transform matrix based on a rotation matrix is well known in the art and described in U.S. application Ser. No. 13/490,326, which is incorporated herein by reference in its entirety. The non-reference images can then be registered with respect with the reference image by applying the perspective transform matrix to each segment of non-reference image (block 165).

Figure 2:
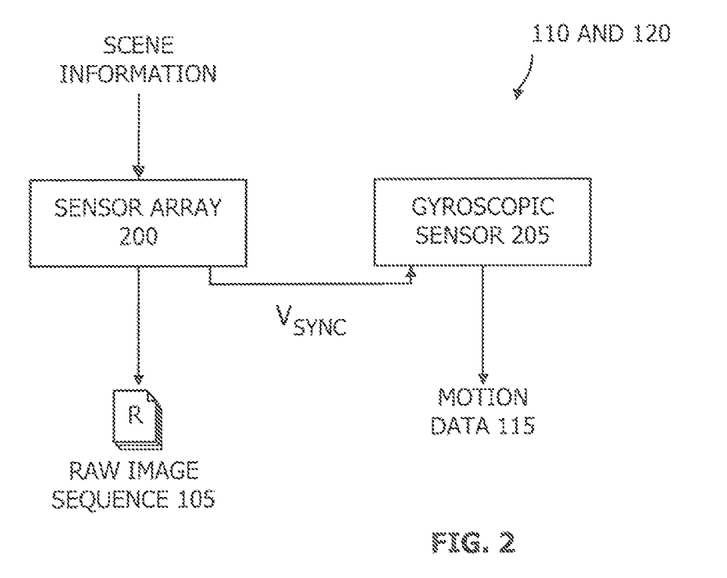
FIG. 2 shows, in flowchart form, a motion information determination operation in accordance with one embodiment.

Referring to FIG. 2, in one embodiment, image capture operation 110 may be performed by sensor array 200 and motion data capture operation 120 may be performed by gyroscopic sensor (gyro) 205. Sensor array 200 may capture black and white or color images and use, for example, complementary metal-oxide semiconductor (CMOS) or charged-coupled device (CCD) technology. Gyro sensor 205 may be used to generate rotation rate data in three dimensions (e.g., (x, y, z) or (pitch, roll, yaw) or in a quaternion system). Gyro sensor 205 may use any desired technology such as micro-electromechanical systems (MEMS) technology. The sensor array 200 and the gyro 205 may be included in a camera. As used herein, the term "camera" refers to any electronic device that includes or incorporates digital image capture functionality. This includes, by way of example, stand-alone cameras (e.g., digital SLR cameras and 'point-and-click' cameras) as well as other electronic devices having embedded camera capabilities. Examples of this latter type include, but are not limited to, mobile phones, tablet and notebook computer systems, and digital media player devices.

In an alternative embodiment, motion data capture operation 120 may be performed by an accelerometer or a combination of a gyro sensor and an accelerometer. It will be understood that images captured in accordance with block 110 (e.g., by sensor array 200) and motion data captured in accordance with block 120 (e.g., by gyro sensor 205) should be correlated. Correlating the image and motion data is known in the art and also described in U.S. application Ser. No. 13/490,326, which is incorporated herein by reference in its entirety.

Although the above discussed motion sensor data approach to image registration provides some advantages, it does not have a high a precision for close objects and cannot distribute registration errors in a visually relevant way over an image. To overcome these shortcomings, a pixel-based registration method can be used.

Figure 3A:
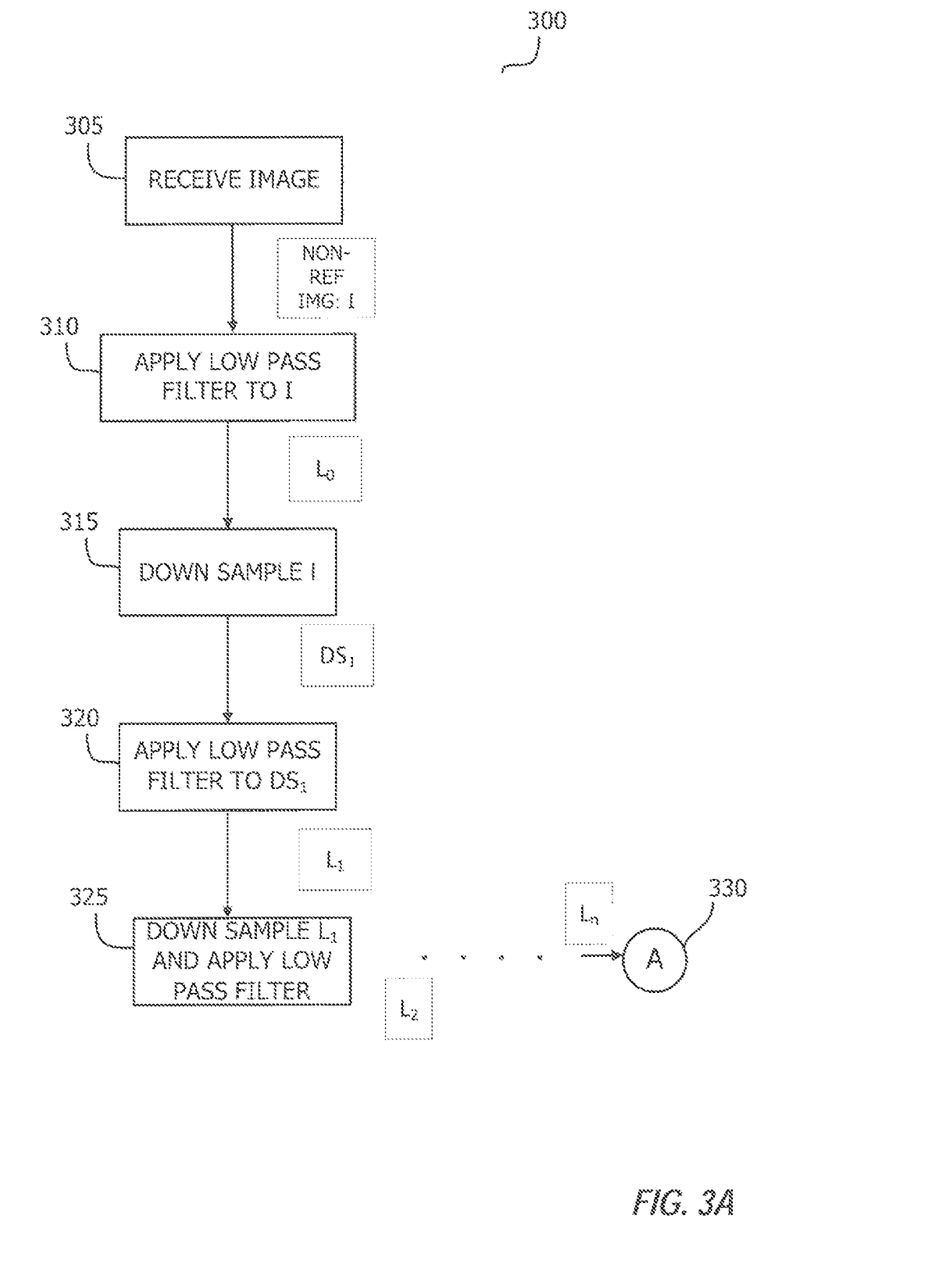
FIGS. 3A-3B show, in flowchart form, a pixel-based registration operation in accordance with one embodiment.

FIG. 3A illustrates a flow chart for an improved pixel based registration method, according to one embodiment. Pixel-based registration operation 300 begins at block 305 when an image is first received. The method 300 involves applying a pyramid decomposition algorithm to the received image to generate a number of levels for the received imaged. This can be done, for example, by first applying a low pass filter to the received image I to remove high frequency details (block 310) and generate a first level image $L_0$ based on the image I. The resulting image may have fewer edges, but more pronounced corners. This may be useful when the levels are utilized in registering the image I. The method 300 may be applied to each non-reference image and to the reference image.

After the image I goes through a low pass filter, it may be down-sampled to reduce the size of the image and generate the image $DS_1$ at block 315. Down-sampling the image may lower its resolution thus also creating more pronounced corners. The down-sampled image $DS_1$ may then be passed through a low pass filter to generate the next level image $L_1$ (block 320). At block 325, the image $L_1$ may be down-sampled and the down-sampled version passed through a low pass filter to generate a next level $L_2$. This process may be repeated until a predetermined number of levels are generated. The predetermined number may be determined by balancing the need for precision with efficiency and data processing capabilities. In one embodiment, the number of levels can be four or five. When having five levels, the method 300 may continue the down sampling and low pass filtering of the image twice more to generate levels $L_3$ and $L_4$.

Figure 4:
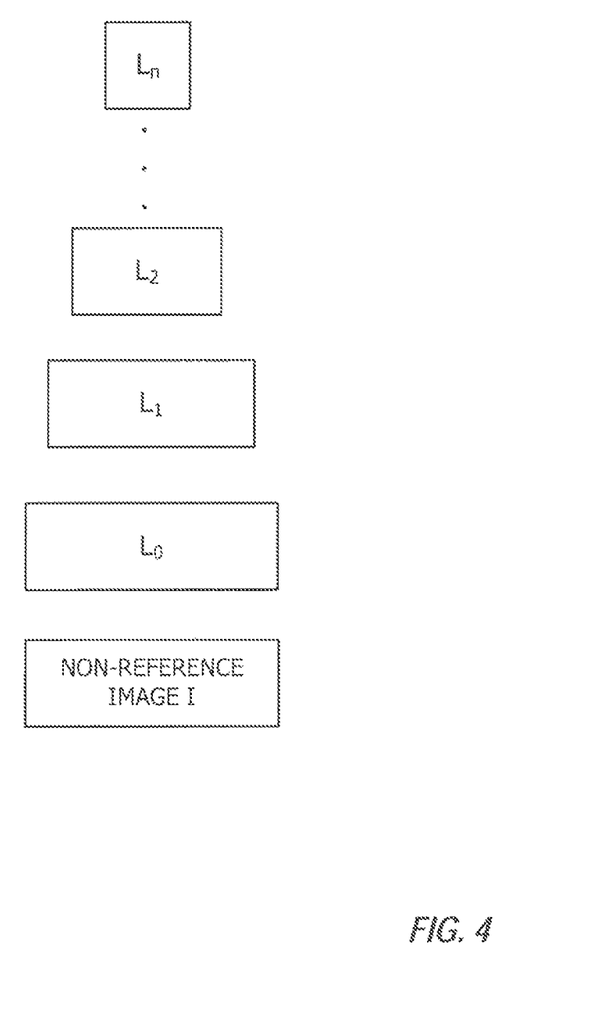
FIG. 4 shows, illustrative levels of images generated in a pyramid decomposition operation in accordance with one embodiment.

FIG. 4 presents a visual representation of the various levels generated by the pyramid decomposition operation 300. As can be seen, the image at each level is smaller than the image at the previous level, generating a pyramid like structure. Thus, $L_n$ is smaller (has a lower resolution) and less noise than $L_{(n-1)}, \ldots L_2, L_1$, and $L_0$. As discussed, this means that $L_n$ will generally have less shakiness and fewer edges, but more pronounced corners. Because the image is down-sampled multiple times, it also means that $L_n$ has fewer pixels and thus, can be processed more quickly. This is important, as pixel-based registration involves detecting corners in the images.

Figure 3B:
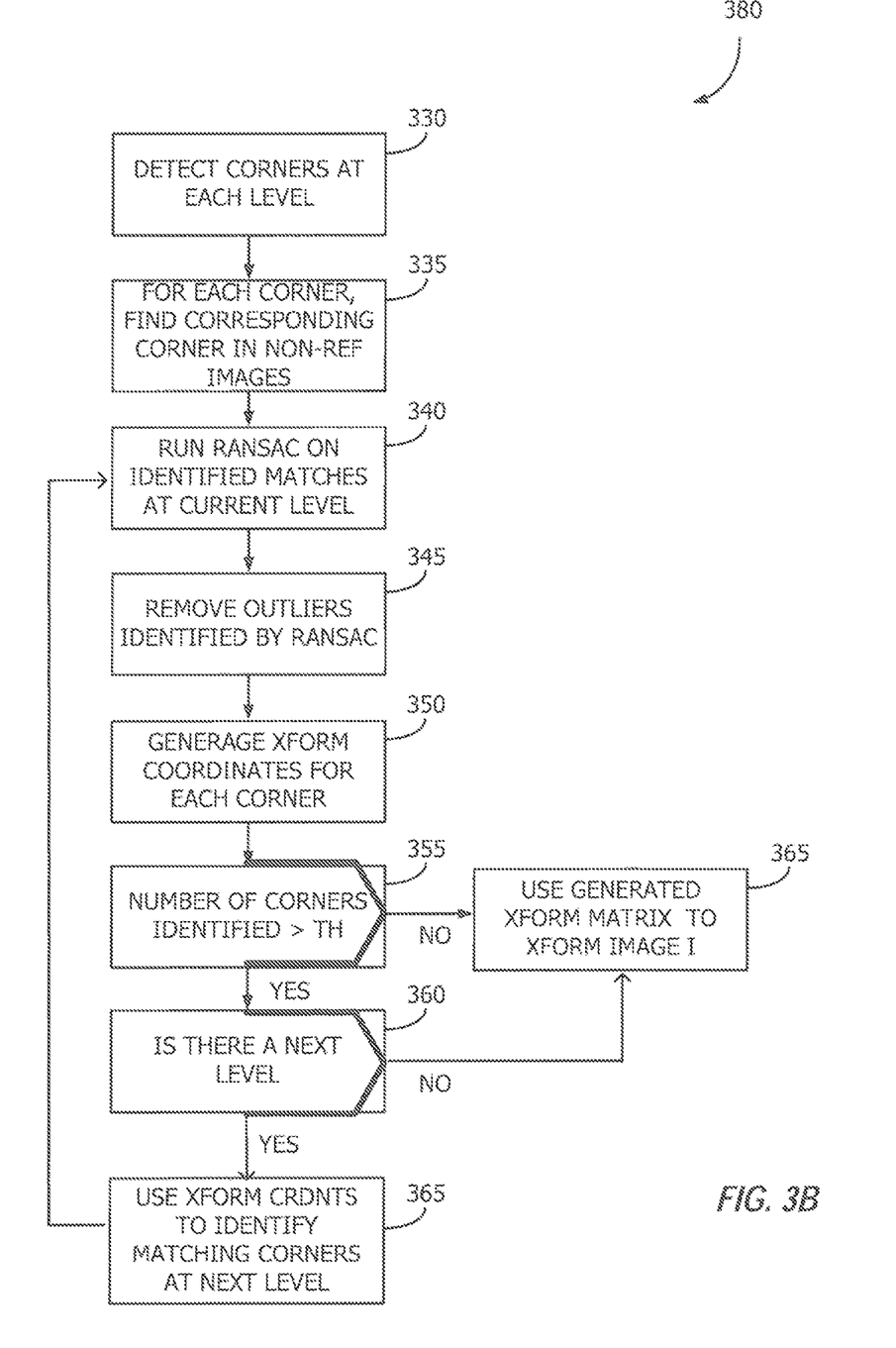

Once a predetermined number of levels have been generated by operation 300, the pixel-based registration approach of the current embodiment moves to block 330 of FIG. 3B to process the various levels. To do so, the operation 380 of FIG. 3B begins at block 330 by detecting corners at each level of the reference image, starting with the highest level $L_n$. To detect corners, $L_n$ may first be divided into a predetermined number of tiles. In one embodiment, the predetermined number of tiles is 100 and the image is thus turned into a 10×10 arrangement of tiles. After dividing the image into a number of tiles, the method can identify one best corner in each of the tiles. In the embodiment where the image is divided into 100 tiles, this results in detecting 100 corners Because there may be portions of the image that do not have any corners (e.g., clear blue sky), in one embodiment, the strength of the identified corners may be compared to a pre-determined minimum corner strength threshold. If the strength for an identified corner falls below the threshold, that corner may be eliminated from the list.

Once the corners are detected and coordinates for each corner identified (e.g., x, y), the operation 380 searches for those coordinates in corresponding levels of each of the non-reference images. At each level of the pyramid there may be an initial guess regarding the geometrical transformation between the corners in the reference and the non-reference images. At the highest level, this initial guess may be assumed to be an identity transform. Thus, to find the matching corners in a corresponding level of a non-reference image, an identity transform may be applied to the reference corners to project the corners into the non-reference image and determine an initial position for them. This initial position can be refined by performing a search within a predetermined range of pixels surrounding the projected position to find a best corresponding corner in the neighborhood of the initial position. This process may be referred to as block matching. Block matching may involve comparing a reference block centered around an identified corner (x0,y0) with blocks in a non-reference image that are in a certain search range of the initial position. The comparison between the blocks may be done using a measure like mean absolute error (MAE), or mean square error (MSE). The best match may be selected by choosing a block whose MAE (or MSE) with respect to the reference block is smaller, than the MAE (or MSE) of the other blocks in the search range.

Once a match is found, the coordinates of the matching corner can be stored and the operation can move to the next corner to find a corresponding match. When all of the identified corners are been matched with corresponding corners in the non-reference images, a RANdom SAmple Consensus (RANSAC) procedure may be run on the matching corners to identify incorrect or outlier matches (block 340). Outlier matches are those do not agree with the majority of the matches found. For example, an outlier match may suggest a translation to the left with 10 pixels, whereas the majority of other matches suggest a translation to the right with 10 pixels. Such outliers can be detected by the RANSAC procedure in accordance with any known transformation model. The detected outlier matches may be removed at block 345. The remaining matches may be referred to as inlier matches. The coordinates of the inlier matches may be used to generate geometrical transformation coordinates for each corner (block 350). Next, The RANSAC procedure may then be used to identify the number of corners that have inlier matches. If the operation determines the number of corners is more than a predetermined threshold at block 355, the operation moves to block 360 to determine if there is a next level image remaining to be processed. If so, the operation can use the calculated transformation coordinates as initial guesses to identify matching the corners at the next level (block 365).

Thus, when examining the $L_{(n-1)}$ level of a non-reference image to find matching corners, the operation uses the transformation coordinates found at $L_n$ to find initial guesses for corners at each tile in $L_{(n-1)}$. This generally increases efficiency and accuracy, and reduces the time required to identify corresponding corners at each level. Once corners are identified at $L_{(n-1)}$, the operation moves to block 340 to again run RANSAC on the identified corners to eliminate outlier matches. Operation 380 may continue until the number of corners identified is less than a predetermined threshold or there are no other levels to be processed. Then, the operation can use the final generated transformation coordinates in a transformation matrix to transform the image I, thus resulting in the non-reference image I being registered with respect to the reference image. As the operation moves from one level to next, the transformation precision may improve as the resolution of each level increases.

As discussed above, using a pixel-based registration approach has the disadvantage of sometimes not being able to detect large motions between images or having difficulty detecting rolling shutter distortion. To overcome these problems, novel approaches have been devised, and are disclosed herein, to integrate a pixel-based registration approach with a motion sensor data-based registration approach.

Figure 5:
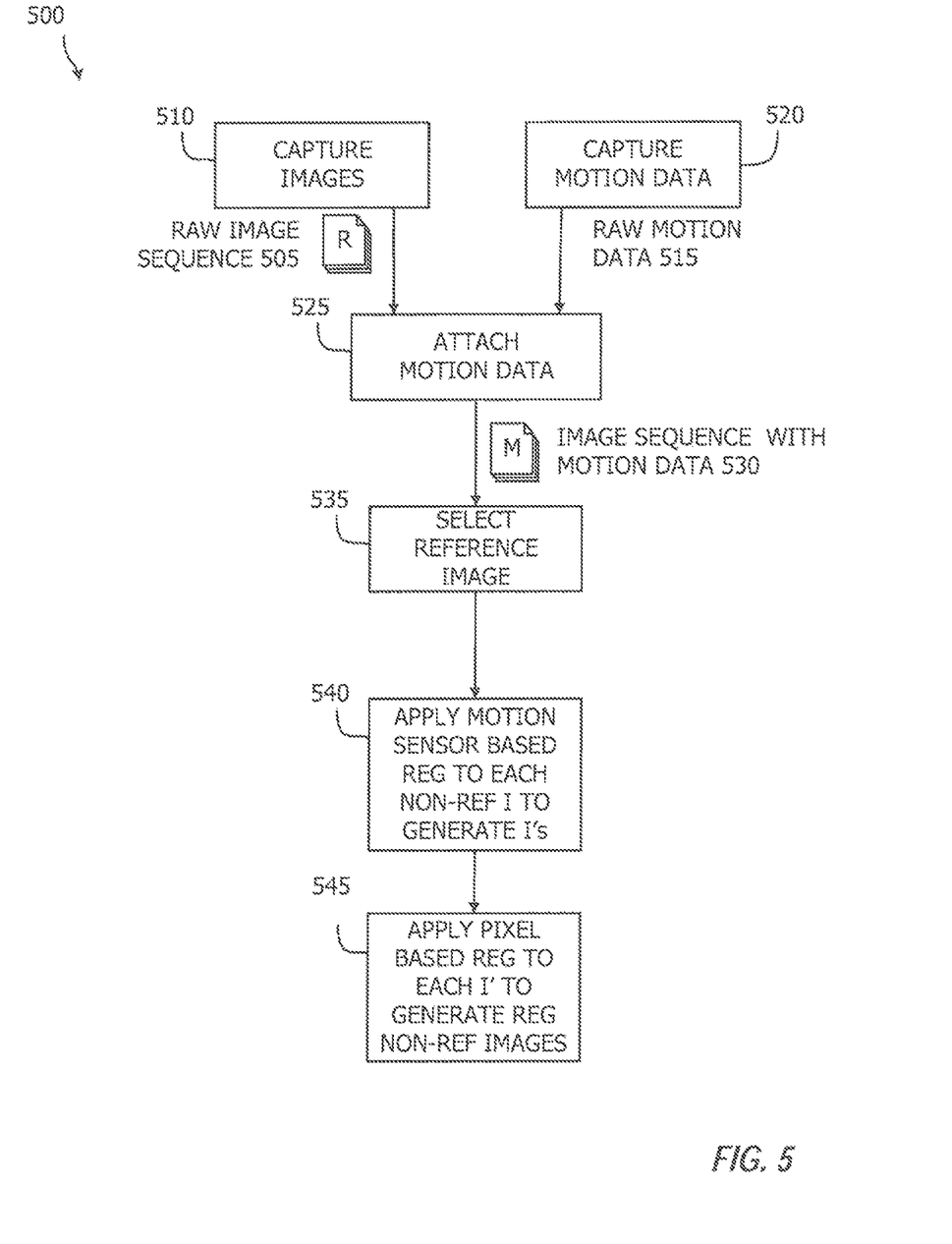
FIG. 5 shows, in flow-chart form, an image stabilization operation in accordance with one embodiment.

One approach for such integration is illustrated in the flow chart of FIG. 5. Operation 500 begins at block 510 by capturing raw image sequence 505 (block 510) and corresponding motion data 515 (block 520). In one embodiment, special image buffer memory may be used to retain the images. In another embodiment, general purpose memory may be used. Motion data 515 may then be attached to individual images within raw image sequence 505 (block 525) to produce image sequence 530. After motion data is attached to the images, one of the images in image sequence 530 may be selected as the reference image (block 535). The operation can then involve applying the above described motion sensor data-based registration to each non-reference image to generate registered non-reference images, I's (block 540). Thus, each non-reference image I in the image sequence 530 may have a corresponding motion sensor data-based registered image I'. The images I's may then be used as input (block 545) into a pixel-based registration algorithm such as that discussed above. This is shown in FIG. 6.

Figure 6:
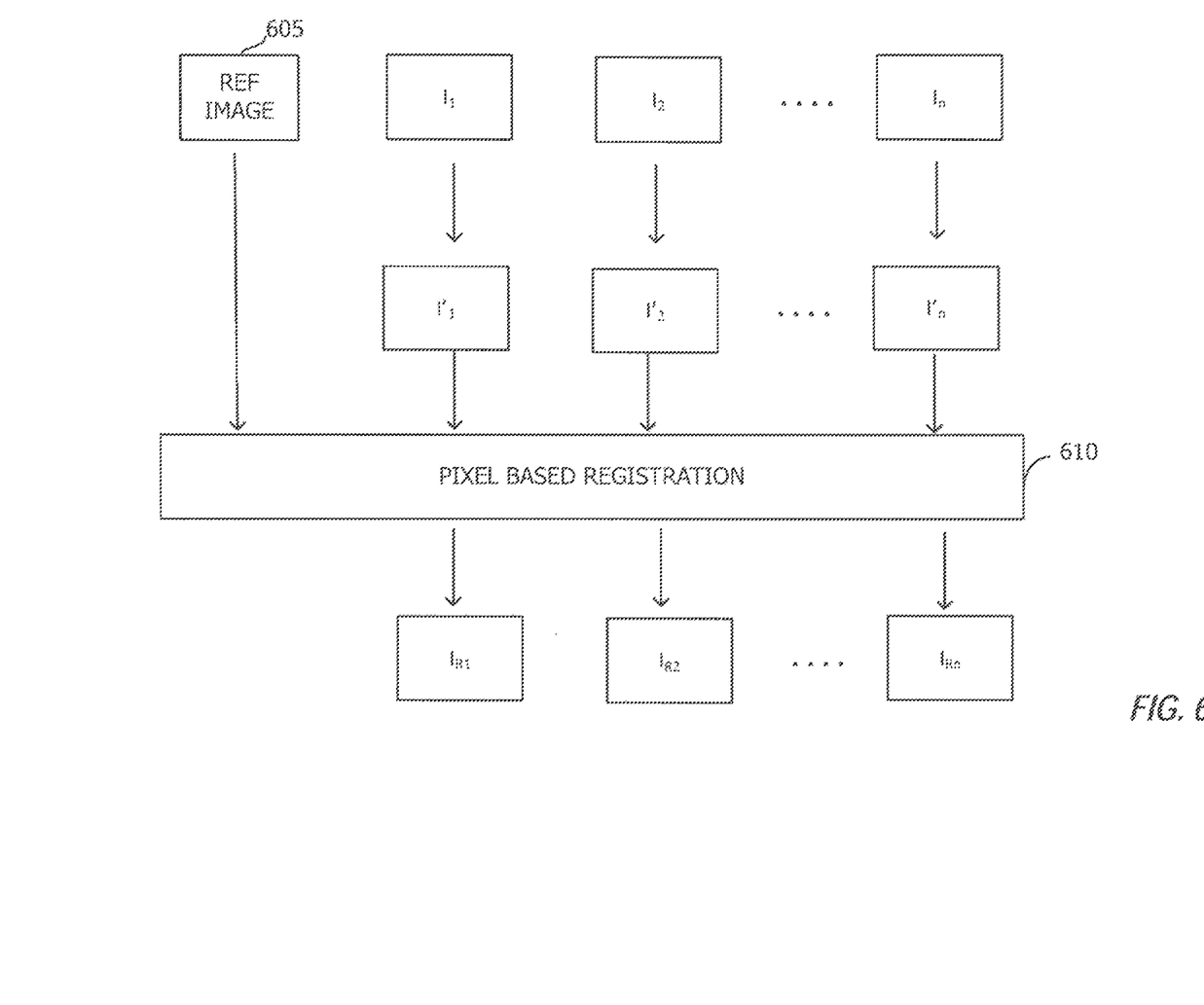
FIG. 6 shows an illustrative block diagram for the image stabilization operation of FIG. 5.

As illustrated in FIG. 6, each of the images $I'_1, I'_2, \ldots, I'_n$ along with the reference image 605 may be input into the pixel-based registration algorithm 610 to undergo a pixel-based registration operation as discussed above. The outputs from the pixel-based registration algorithm, $I_{R1}, I_{R2}, \ldots, I_{Rn}$ are the final outputs of the registration method 500.

By performing a motion sensor data-based registration on the images before applying a pixel-based registration, the operation can ensure that movement between images and effects of rolling shutter distortion are accounted for in the final registered images, while also taking advantage of the precision offered by pixel-based approaches with respect to close objects.

The approach of operation 500, while advantageous over prior art approaches, lacks some efficiency in that each non-reference image is processed twice. That means, in one embodiment, that each non-reference image is warped twice. To improve this, an alternative method such as the embodiment illustrated in FIG. 7 can be used.

Figure 7:
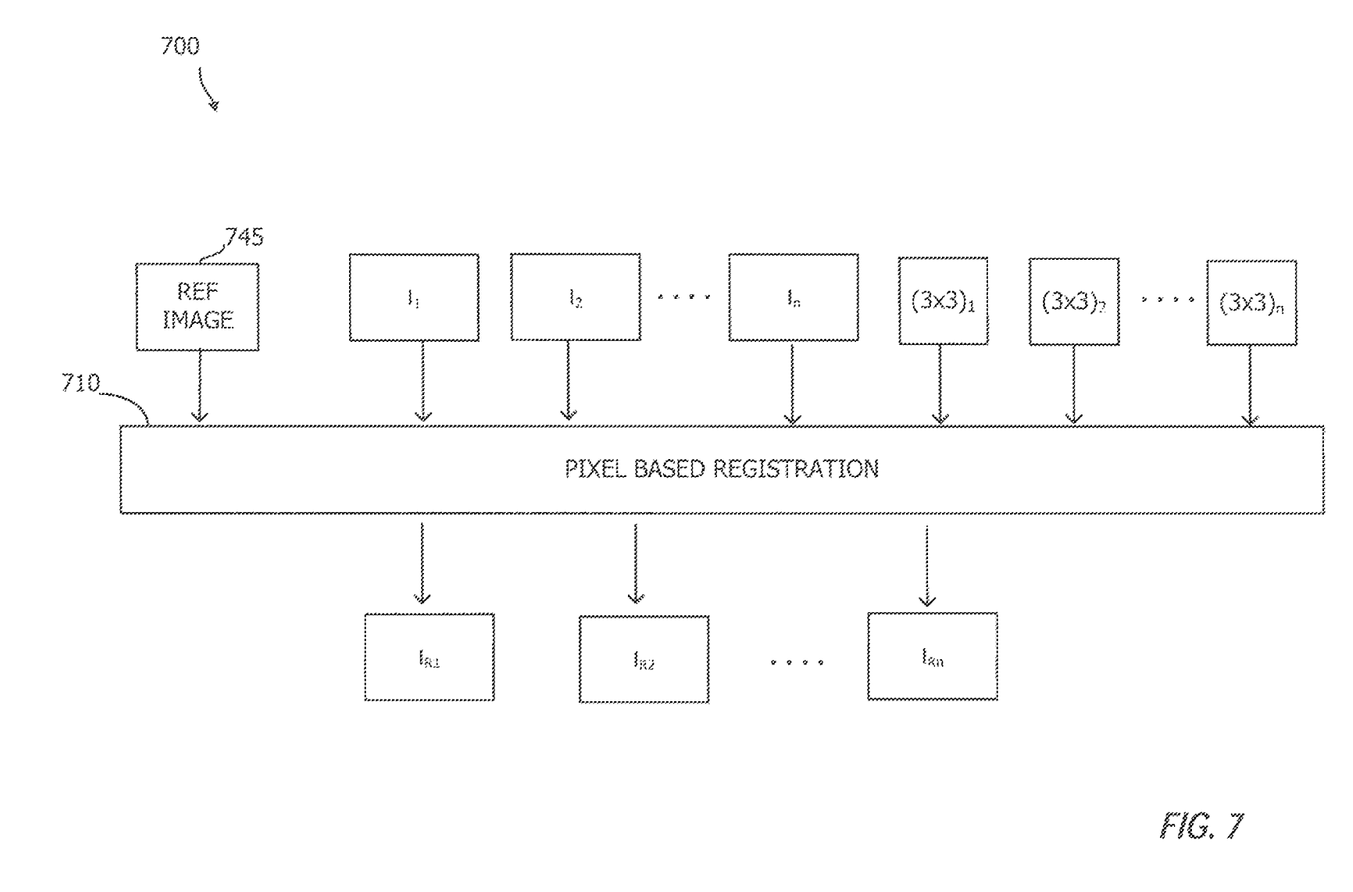
FIG. 7 shows an image stabilization operation in accordance with an alternative embodiment.

Operation 700 involves applying the motion sensor data-based registration on each received non-reference image I to obtain a 3×3 transformation array (aka a "perspective transform matrix") for each non-reference image. Thus, if n non-reference images are received, the method may have n 3×3 transformation arrays. The 3×3 transformation arrays can provide an indication of motion between pixels in each non-reference image and the reference image. These transformation arrays may be provided to the pixel-based registration algorithm 710 along with each of the original non-reference images $I_2, \ldots, I_n$ and the reference image 745.

The transformation arrays may provide an initial estimate of alignment for the pixel-based registration algorithm 710. This means that the pixel-based registration has prior knowledge of some of the changes between the images and thus may have an initial idea of where to look for corresponding corner pixels. This can be advantageous in multiple ways. One advantage is that having prior knowledge of motion between pictures helps the pixel-based approach identify corresponding pixels faster and thus increases efficiency. Another advantage is that it can help identify large motions or corners between images which may otherwise have been missed. That is because the pixel-based approach only looks for corresponding pixels in blocks of limited size. Thus, if there is large motion between the two images and the corresponding pixel is outside the size of the block searched, the pixel-based approach may miss the corresponding pixel. However, by having prior knowledge of such motions, the pixel-based approach can take this information into consideration and look for corresponding pixels around where they are expected to be based on the transformation arrays.

Using the information contained in the transformation arrays, the pixel-based algorithm 710 can register each non-reference image and provide the final outputs $I_{R1}, I_{R2}, \ldots, I_{Rn}$. This means that operation 700 can be more efficient than operation 500, because the non-reference images in operation 700 are generally only warped once. Moreover, by warping only once, the effects of blur introduced as part of the transformation process can be minimized.

By not having to apply the motion sensor data-based registration to each non-reference image the method can significantly improve efficiency and still achieve comparable results. That is because motion information is generally more visible and relevant in objects and corners in an image than in smooth areas. Thus, by taking into account the effects of motion for corners and disregarding it for other areas, the operation can account for motion where it matters most, while significantly reducing the processing required.

Figure 8A:
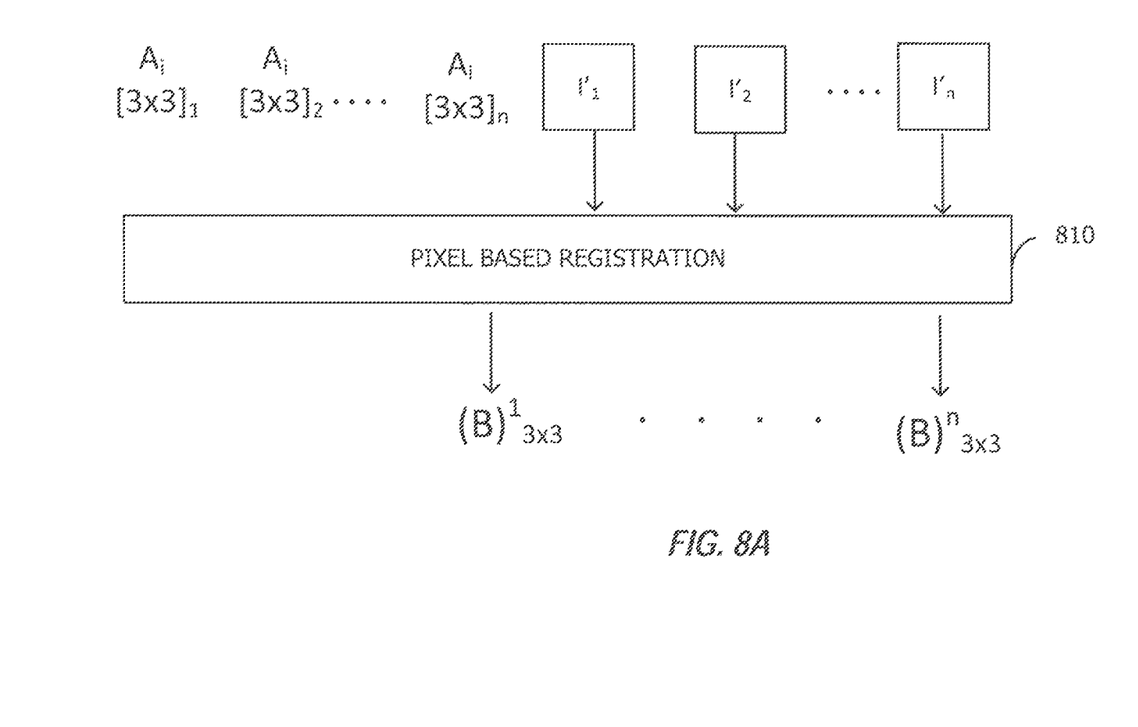
FIGS. 8A-8B show an image stabilization operation in accordance with yet alternative embodiment.
Figure 8B:
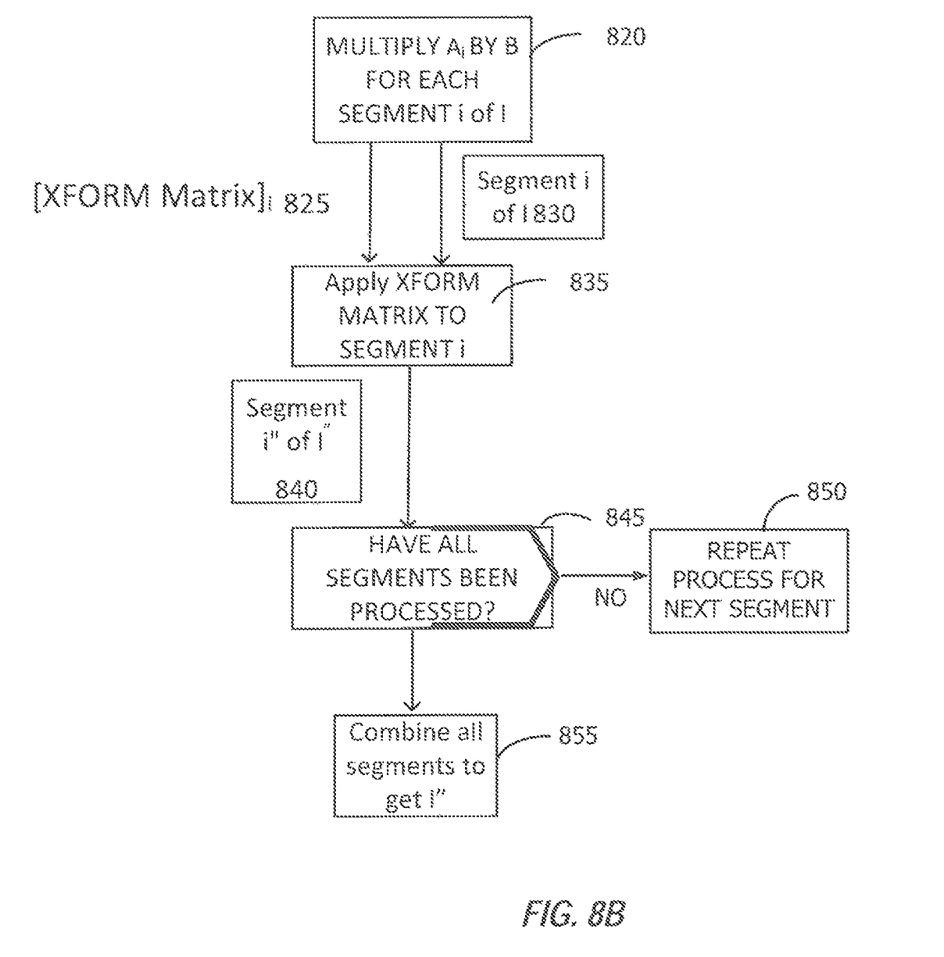

FIGS. 8A-8B illustrate an approach for integrating motion and pixel-based registrations which takes into account the effects of rolling shutter distortion. This approach uses motion sensor data to correct for rolling shutter distortion, and then provides the corrected images to the pixel-based registration algorithm. To account for rolling shutter distortion in motion sensor data-based registration, an image may be divided into a number of segments, each segment being represent by the letter i. A segment represents a set of one or more sensor rows (columns) of pixels that are captured at the same time. The number of segments varies in different embodiments and in one configuration may be 32.

As illustrated in FIG. 8A, each of the non-reference images may first go through the motion sensor data-based registration to generate $I'_1, I'_2, \ldots, I'_n$. The same registration may also generate [3×3] transformation matrices, $A_i$, for each segment of the image. The motion sensor registered images $I'_1, I'_2, I'_n$ may be input into the pixel-based registration algorithm 810. The pixel-based registration algorithm 810 can then examine each of the non-reference images $I'_2, \ldots, I'_n$, and generate the $(B)_{3\times3}$ transformation matrices for each image without generating registered images.

FIG. 8B illustrates the steps performed by the method after the pixel-based registration algorithm 810 is completed and all of the B matrices are generated. The B matrix for each non-reference image may be combined (i.e., multiplied) with the A matrix for each segment of that image to generate a [XFORM Matrix]$_i$ 825 (block 820). The resulting transform matrix 825 may then be applied to the segment i of the original non-reference image I to get a final segment i" 840 of the registered image (block 835). At this point, the operation can check to see if all of the segments for the non-reference image have been processed in this manner (block 845). If that is not the case, the operation moves to the next segment (i+1) to generate the next segment of the final image. Once all of the segments for an image have been processed, the operation moves to block 855 to combine all the segments and generate the final registered image I". This operation ensures that the final image is only warped once, thus eliminating unnecessary blur caused by multiple warping.

Figure 9:
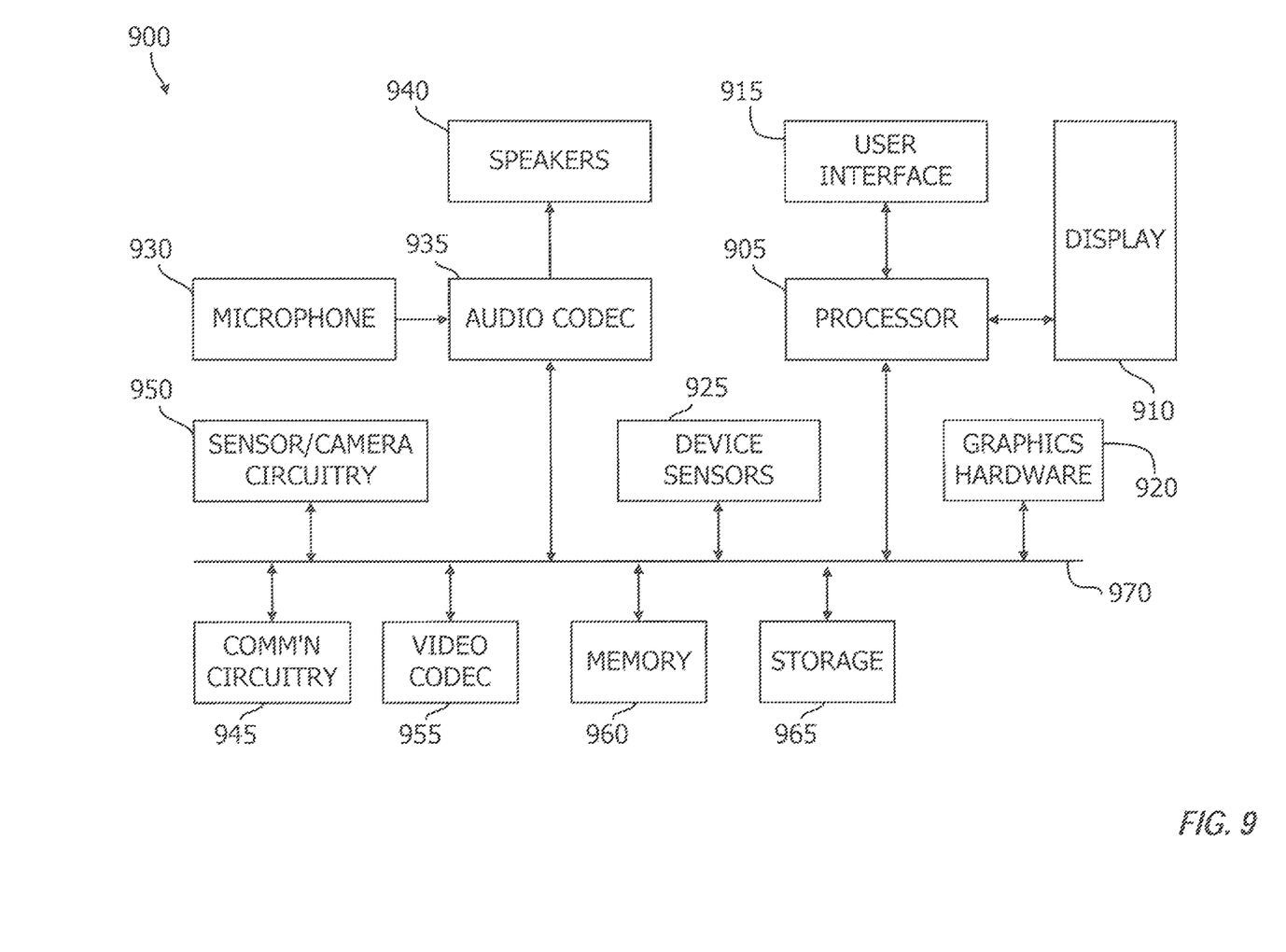
FIG. 9 shows, in block diagram form, a multi-function electronic device in accordance with one embodiment.

Referring to FIG. 9, a simplified functional block diagram of illustrative electronic device 900 is shown according to one embodiment. Electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, digital image capture unit 950, video codec(s) 955, memory 960, storage 965, and communications bus 970. Electronic device 900 may be, for example, a digital camera, a personal digital assistant (PDA), personal music player, mobile telephone, server, notebook, laptop, desktop, or tablet computer. More particularly, the disclosed techniques may be executed on a device that includes some or all of the components of device 900.

Processor 905 may execute instructions necessary to carry out or control the operation of many functions performed by device 900. Processor 905 may, for instance, drive display 910 and receive user input from user interface 915. User interface 915 can take a variety of forms, such as a button, keypad, dial, a click wheel, keyboard, display screen, a touch screen, or combinations thereof. Processor 905 may also, for example, be a system-on-chip such as those found in mobile devices and include a dedicated graphics processing unit (GPU). Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 to process graphics information. In one embodiment, graphics hardware 920 may include a programmable graphics processing unit (GPU).

Sensor and camera circuitry 950 may capture still and video images that may be processed, at least in part, in accordance with the disclosed techniques by video codec(s) 955 and/or processor 905 and/or graphics hardware 920, and/or a dedicated image processing unit incorporated within circuitry 950. Images so captured may be stored in memory 960 and/or storage 965. Memory 960 may include one or more different types of media used by processor 905 and graphics hardware 920 to perform device functions. For example, memory 960 may include memory cache, read-only memory (ROM), and/or random access memory (RAM). Storage 965 may store media (e.g., audio, image and video files), computer program instructions or software, preference information, device profile information, and any other suitable data. Storage 965 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 960 and storage 965 may be used to tangibly retain computer program instructions or code organized into one or more modules and written in any desired computer programming language. When executed by, for example, processor 905 such computer program code may implement one or more of the operations described herein.

It is to be understood that the above description is intended to be illustrative, and not restrictive. The material has been presented to enable any person skilled in the art to make and use claimed subject matter and is provided in the context of particular embodiments, variations of which will be readily apparent to those skilled in the art (e.g., some of the disclosed embodiments may be used in combination with each other). For example, while FIGS. 3-8 have been described in the context of processing raw or unprocessed images, this is not necessary. Image stabilization operations in accordance with this disclosure may be applied to processed versions of the captured images (e.g. edge-maps) or sub-sampled versions of the captured images. In addition, some of the described operations may have their individual steps performed in an order different from, or in conjunction with other steps, that presented herein. More generally, if there is hardware support some operations described in conjunction with FIGS. 3-8 may be performed in parallel.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable control device and comprising instructions stored thereon to cause the programmable control device to:
   obtain a first image and a first one or more additional images;
   obtain motion information corresponding to each of the first one or more additional images;
   compensate for motion between the first image and each of the first one or more additional images based, at least in part, on each image's corresponding motion information to generate a second one or more additional images, by:
      determining a transform matrix for each of a plurality of segments of each of the first one or more additional images based, at least in part, on the motion information, and
      applying the transform matrix for each of the first one or more additional images to the corresponding first one or more additional image,
   wherein each of the second one or more additional images has a corresponding image in the first one or more additional images, and wherein each segment corresponds to a plurality of pixel rows in an image; and
   register the second one or more additional images with respect to the first image based, at least in part, on a pixel-level analysis of the first image and each of the second one or more additional images to generate an output image.

2. The non-transitory program storage device of claim 1, further comprising instructions to cause the one or more programmable control devices to identify the first image as a reference image.

3. The non-transitory program storage device of claim 1, wherein the motion information comprises motion information of each of the first one or more additional images with respect to the first image.

4. The non-transitory program storage device of claim 1, wherein the instructions to cause the programmable control device to register the second one or more additional images based, at least in part, on a pixel-level analysis of the first image and one of the second one or more additional images comprise instructions to cause the programmable control device to:
apply pyramid decomposition to the first image and one of the second one or more additional images to generate a plurality of levels for each of the first image and the one of the second one or more additional images;
detect corners at each level of the first image and for each detected corner, wherein the instructions to cause the programmable control device to detect corners comprise instructions to cause the programmable control device to:
search for a corresponding corner in a corresponding level of the one of the second one or more additional images;
generate a transformation matrix based on locations of the corresponding corners found; and
apply the transformation matrix to the one of the second one or more additional images.

5. A non-transitory program storage device, readable by a programmable control device and comprising instructions stored thereon to cause the programmable control device to:
obtain a first image and a first one or more additional images;
obtain motion information corresponding to each of the first one or more additional images;
determine a transform matrix for each of a plurality of segments of each of the first one or more additional images based, at least in part, on the motion information, wherein each segment corresponds to a plurality of pixel rows in an image;
apply the transform matrix for each of the first one or more additional images to the corresponding first one or more additional image; and
register the first one or more additional images with respect to the first image based, at least in part, on a pixel-level analysis of the first image, the first one or more additional images and the transform matrices for each of the first one or more additional images to generate an output image.

6. The non-transitory program storage device of claim 5, wherein the motion information comprises gyroscope data.

7. The non-transitory program storage device of claim 5, wherein the motion information comprises of motion of each of the first one or more additional images with respect to the first image.

8. A non-transitory program storage device, readable by a programmable control device and comprising instructions stored thereon to cause the programmable control device to:
obtain a first image having a plurality of pixels arranged in rows;
obtain a first one or more additional images, wherein a plurality of pixels in the first image have corresponding pixels in each of the first one or more additional images;
obtain motion information corresponding to each of the first one or more additional images;
determine a first transform matrix for each segment of each of the first one or more additional images based, at least in part, on the motion information, wherein each segment corresponds to a one or more rows of pixels;
compensate for motion between the first image and each of the first one or more additional images based, at least in part, on each image's corresponding motion information to generate a second one or more additional images, wherein each of the second one or more additional images has a corresponding image in the first one or more additional images;
determine a second transform matrix for each of the first one or more additional images based, at least in part, on a pixel-level analysis of the first image and the second one or more additional images;
combine each image's first transform matrices and the corresponding second transform matrices to generate a transformation matrix for each segment of each of the first one or more additional images;
apply the transformation matrices to corresponding segments of the first one or more additional images to generated one or more transformed segments for each of the first one or more additional images; and
combine the transformed segments for each of the first one or more additional images to register the first one or more additional images.

9. The non-transitory program storage device of claim 8, further comprising instructions to cause the one or more programmable control devices to identify the first image as a reference image.

10. The non-transitory program storage device of claim 8, wherein the motion information comprises gyroscope data.

11. The non-transitory program storage device of claim 10, wherein the motion information comprises motion information of each of the first one or more additional images with respect to the first image.

12. A non-transitory program storage device, readable by a programmable control device and comprising instructions stored thereon to cause the programmable control device to:
obtain a first and a second images;
obtain motion information corresponding to the first and second images;
compensate for motion between the first and second images based, at least in part, on the motion information corresponding to the first and second images, wherein the instructions to compensate for motion between the first and second images further comprise instructions to:
apply pyramid decomposition on each of the first and the second images to generate a plurality of levels for each image;
detect corners at each level of the first image;
for each corner detected at each of level the first image, search for a corresponding corner in a corresponding level of the second image; and
generate a transformation matrix for each corresponding corner identified based on locations of the corresponding corners; and
apply the transformation matrices to the second image to register the second image, wherein the second image is registered based, at least in part, on a pixel-level analysis of the first image and the second image.

13. The non-transitory program storage device of claim 12, wherein the instructions to cause the programmable control device to applying pyramid decomposition comprises applying a low pass filter and down sampling the image two or more times to generate a plurality of levels.

14. The non-transitory program storage device of claim 12, wherein a location of corresponding corners identified at a lower level is used as an initial guess for identifying corresponding corners in a subsequent level.

15. The non-transitory program storage device of claim 12, further comprising instructions to cause the one or more programmable control devices to identify and remove outliers in the corresponding corners.

* * * * *